United States Patent [19]

Naae et al.

[11] Patent Number: 4,739,040

[45] Date of Patent: Apr. 19, 1988

[54] SURFACTANTS FROM LIGNIN

[75] Inventors: Douglas G. Naae, Houston; Lawrence E. Whittington, Katy; Will A. Ledoux, Sugar Lane; Francis E. Debons, Richmond, all of Tex.

[73] Assignee: Texaco Inc., White Plains, N.Y.

[21] Appl. No.: 946,270

[22] Filed: Dec. 24, 1986

[51] Int. Cl.$^4$ .................. C08H 5/02; C07C 43/115
[52] U.S. Cl. .................. 530/503; 260/505 R; 260/512 R; 530/502; 568/608; 568/790; 558/33
[58] Field of Search .............. 530/503, 502; 568/608, 568/790; 558/33; 260/512 R, 505 R

[56] References Cited

U.S. PATENT DOCUMENTS

| | | | |
|---|---|---|---|
| 2,531,502 | 11/1950 | DeGroote et al. | 568/608 |
| 3,105,095 | 9/1963 | Oshima et al. | 530/503 X |
| 3,223,698 | 12/1965 | Oshima et al. | 530/503 |
| 3,253,044 | 5/1966 | Goheen | 530/503 X |
| 3,865,803 | 2/1975 | Falkehag | 530/502 X |
| 4,420,644 | 12/1983 | Huibers et al. | 568/799 X |
| 4,647,704 | 3/1987 | Engel et al. | 568/716 |

*Primary Examiner*—Earl Nielson
*Attorney, Agent, or Firm*—Jack H. Park; Kenneth R. Priem; Harold J. Delhommer

[57] ABSTRACT

A method of producing surfactants from lignin is disclosed by reducing lignin in the presence of a carbon monoxide or hydrogen reducing agent at high temperature and pressure to produce low molecular weight lignin phenols and subjecting the lignin phenols to one or a combination of several reactions such as alkoxylation, alkylation, sulfonation, sulfation, alkoxysulfation, and sulfomethylation. The lignin surfactants so produced can be employed in a surfactant system to recover oil from underground formations.

42 Claims, No Drawings

SURFACTANTS FROM LIGNIN

BACKGROUND OF THE INVENTION

This invention relates to a method of producing surfactants from lignin and to a method of recovering oil from subterranean formations with surfactant flooding systems that incorporate lignin surfactants.

Surface active compounds or surfactants have become extremely important chemicals in our society. Numberless types of surfactants are used for a myriad of applications. To work effectively, surfactants require water soluble and oil soluble characteristics. It is these mixed characteristics which enable surfactants to lower the interfacial tension between two disparate liquids.

One problem with many surfactants is their high cost of manufacture. Surfactants which are relatively cheap have an inherent advantage in the market place.

A minor use of surfactants has been in surfactant flooding systems for enhanced oil recovery. But because of the relatively high cost of surfactants, surfactant flooding systems for oil recovery have generally not been economical. The economics of surfactant flooding have additionally become more unfavorable recently with the low price of oil.

Surfactant flooding to recover oil has been actively investigated due to the relatively poor ability of water floods to displace remaining oil from a reservoir's pore structure. Because of the structure of the reservoir and relative interfacial tensions involved, the flood water may form channels or fingers, bypassing the oil in the formation. Even where water has flowed, residual oil is trapped in pores by viscous and capillary forces. Further flooding with water will not remove such oil.

Investigations of ways to increase oil recovery by improving the displacement ability of water floods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a water flood operation is dependent upon reservoir characteristics as well as the cost and availability of the surfactants.

Most surfactant floods have employed a petroleum sulfonate as a sole surfactant, or at least a major component of a mixture of surfactants. Synthetic alkyl benzene sulfonates and alkyl sulfonates and sulfates have also been proposed as oil recovery surfactants. To combat separation problems in surfactant mixtures, especially at high salinities (>2% salt), a material with both water soluble and oil soluble characteristics is usually added to sulfonate surfactant mixtures. These materials are generally referred to as "solubilizers" and are usually sulfate or sulfonate salts of polyethoxylated alcohols or alkylphenols. The choice and concentration of solubilizer employed is dependent upon the choice of surfactants used, their overall concentration, and salinity.

The reduction of lignins to produce certain simpler compounds is known in the art. The transformation of lignins to commodity chemicals such as benzene, phenol or cresol by hydrogenation has been extensively researched. Carbon monoxide reduction is a little known area. Some work has been done on the reduction of coal by carbon monoxide, but little investigation has been made into the reduction of lignins by carbon monoxide.

The extensive research into the hydrogenation of lignins generally fits into two categories. Studies have been concerned with either the hydrogenation of wood as a pulping method or with the hydrogenation of lignin as a method to produce commodity chemicals. In the 1960s, Crown Zellerbach extensively studied the Noguchi process for converting desulfonated lignins to monophenols by catalytic hydrogenation. This is discussed in Goheen, D. W., "Hydrogenation of Lignin by Noguchi Process", *Lignin Structure and Reactions*, R. F. Gould, ed., ACS (1966).

More recently, Hydrocarbon Research, Inc. developed the Lignol process for converting kraft lignin to benzene and phenol as discussed in U.S. Pat. No. 4,420,644, and Huibers, D. T. A. and Jones, M. W., Can. J. Chem. Eng., Vol. 58, p. 718-722 (1980). This process achieved 20% to 35% yields of distillable monophenols. The Lignol process was designed to produce saleable commodity chemicals by adding separation and purification steps to the hydrogenation process.

Continental Can Company has published results of their research on aqueous hydrogenation of kraft lignin involving catalysts such as Raney Nickel and Raney Copper. Please see, Benigni, J. D., and Goldstein, I. S., J. Polymer Science. Part C, p. 467-75, 477-78 (1971).

The Noguchi, HRI, Lignol, and Continental Can processes used non-sulfonated lignin to keep from poisoning the hydrogenation catalyst with sulfur. This restriction placed a further limitation on the hydrogenation reaction as non-sulfonated lignins are less readily available than lignin sulfonates. Therefore, research was directed to hydrogenating lignin sulfonates with sulfur resistant catalysts. Generally, these processes have used an iron catalyst in a pasting oil that consists of the high boiling residue from the previous hydrogenation. These processes which yield 30% to 60% conversion of lignin sulfonate to distillable products are described in U.S. Pat. No. 3,253,044 and Canadian Patent No. 559,006.

The hydrogenation of wood has also been studied to determine the types of compounds produced. Please see, Boocock, D. G. B., Mackay, D., McPherson, M., Nadeau, S., and Thurier, R., Can. J. Chem. Eng., Vol. 57, p. 98-101 (1979); Boocock, D. G. B. and Mackay, D., Energy Biomass Wastes, Vol. 4, p. 765-77 (1980); Boocock, D. G. B., Kallury, R. K. M. R., and Tidwell, T. T., Anal. Chem., Vol. 55 p. 1689-94 (1983); Bhaskaran, T. A. and Schuerch, C., Tappi, Vol. 52, p. 1948-52 (1969); and Burton, A., DeZutter, D., Grange, P., Poncelet, G., and Delmon, B., Comm. Eur. Commun., p. 935-9 (1983).

Two references have been found in the coal literature which imply that carbon monoxide and water may be better reducing agents for lignins than hydrogen. Please see, El-Saied, H. and Oelert, H. H., "Liquefaction of the Lignohemicellulosic Waste from Sulphite Spent Liquor," Cellulose Chem. Technol., Vol. 14, p. 507-516 (1980); and Baltisberger, R. J., Stenberg, V. I., Klabunde, K. J., and Woolsey, N. F., "Chemistry of Lignite Liquefaction," Final Progress Report January 1980-December 1982, DOE/FC/02101-23, July 1983, p. 68-71 and 97-110. The DOE report cited above also discloses that sulfur-containing materials could act as catalysts in carbon monoxide reductions of coal. Finally, a reference entitled "Dissimilar Behavior of Carbon Monoxide Plus Water and of Hydrogen in Hydrogenation," by Herbert Appell, Irving Wender and Ronald Miller of the Pittsburgh Coal Research Center of the U.S. Bureau of Mines published in American Chemical Society, Div. Fuel Chem., Prepr., Vol. 13(4), p. 39-44, reports one laboratory run where a small quantity of lignin was reduced by carbon monoxide to yield a benzene soluble material.

SUMMARY OF THE INVENTION

A method of producing surfactants from lignin is disclosed, along with a method for recovering oil from underground formations by means of a surfactant flooding system containing these lignin surfactants. Lignin is placed in contact with water, and converted into low molecular weight lignin phenols by reducing the lignin in the presence of a carbon monoxide or hydrogen reducing agent at high temperature and pressure. The lignin phenols that are produced from the reduction reaction can be recovered from the reaction mixture with a suitable organic solvent such as benzene, toluene, tetrahydrofuran, ether or diethyl ether. Other organic solvents that will solubilize lignin phenols can also be employed instead of the solvents listed above. The lignin phenols are then converted into lignin surfactants by one or a combination of several reactions such as alkoxylation, alkylation, sulfonation, sulfation, alkoxysulfation, and sulfomethylation.

This method of producing lignin surfactants provides low cost surfactants which can be used to substantially lower the cost of surfactant flooding systems for recovering oil from underground hydrocarbon formations. Effective surfactant flooding systems can be formulated which contain certain of these lignin surfactants as sole surfactants, as co-surfactants, as solubilizers, or as surfactants and a solubilizers. Substantial benefits are obtained from the low cost of these surfactants and ready availability of lignin and lignosulfonates, the precursor compounds.

DETAILED DESCRIPTION

Both lignin and lignosulfonates may be used in the instant process to prepare the lignin surfactants. The process differences involve no more than a possible change of catalyst and minor modifications in process conditions. Regardless of the starting material, the reduction by carbon monoxide or hydrogen degrades the lignin polymer structure to its simpler repeating units, and in the case of lignosulfonate, severs the sulfonate radical.

The degradation by reduction produces a complex mixture of low molecular weight lignin phenols when done under elevated heat and pressure. These lignin phenols are generally derived from or based on a propane phenol structure which has high solubility in organic solvents. The basic reaction is illustrated below.

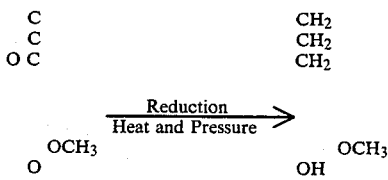

Analysis of the lignin phenol product of the instant process indicates an average molecular weight of about 300 and a range of about 150 to about 1000, compared to a propane phenol molecular weight of 136 and a lignin molecular weight of 3000 to 15,000. It is believed that the lignin phenol product is composed of two, three, four, or more propane phenols linked or fused together plus assorted methoxyls, hydroxyls and other oxygens. Whenever the phrase "lignin phenol" is used herein, it refers to the above product mixture and not propane phenol.

The lignin phenol itself is oil soluble and not water soluble. Consequently, it is not very useful as an enhanced oil recovery surfactant. The aromatic ring and phenolic hydroxyl provide reactive sites for further chemical reactions. These reactions include one or a combination of alkoxylation with ethylene oxide, propylene oxide, or butylene oxide, sulfonation, sulfation, alkoxysulfation, alkylation, or sulfomethylation.

The reduction reaction is carried out by placing the lignin in contact with water. A high pressure vessel must be used so as so carry out the reduction at a temperature greater than about 200° C., preferably about 300° C. to about 550° C. and a pressure greater than about 100 psi, preferably greater than 500 psi, and perhaps greater than 1000 psi. The lignin may be dissolved or slurried in aqueous medium in concentrations preferably ranging from about 5% to about 20% by weight. Sodium hydroxide or a similar compound may be placed in the aqueous medium in a concentration of about 1% to about 15% by weight, preferably about 5% to about 10% by weight, based upon the weight of the lignin. The addition of sodium hydroxide will increase the amount of lignin which can be solubilized by an aqueous medium.

A pasting oil can be used as the solvent for the lignin reduction reaction. This embodiment does away with the need for a later separation step from water in some cases before proceeding with the final reactions. But it is still necessary to contact the lignin with a relatively small amount of water for an effective reduction to take place.

It is preferred that the reducing agent be injected into the reaction vessel so as to blanket the reduction reaction mixture at an initial pressure greater than about 100 psi, preferably greater than about 500 psi, and most preferably, greater than about 900 psi. This is true where the reducing agent is hydrogen, carbon monoxide, a mixture of hydrogen and carbon monoxide, or synthesis gas. Synthesis gas is any of a wide range of gaseous mixtures resulting from the reaction of carbon-rich substances with steam or steam and oxygen. These gaseous mixtures contain chiefly carbon monoxide and hydrogen, plus relatively low percentages of carbon dioxide and nitrogen.

The reduction reaction will produce much higher yields of lignin phenols if a catalyst is employed with the reducing agent. A ferrous salt, which will provide a ferrous ion ($Fe^{+2}$) to the reaction mixture, is the preferred catalyst for hydrogenation of lignosulfonate. It should be added in about a 1% to about 15% concentration by weight based on the starting lignosulfonate. Other metal ions which may be used to catalyze the hydrogenation of lignosulfonate are: cobalt, molybdenum, nickel and aluminum. When it is desired to reduce kraft lignin, alkali lignin, or desulfonated lignosulfonate by hydrogenation, it is preferred to use about 1% to about 15% by weight of a Raney Nickel catalyst, based on the weight of the kraft lignin. Other catalysts such as palladium may be employed, but Raney Nickel is the most preferred catalyst. However, a Raney Nickel catalyst has little effect upon catalyzing the hydrogenation of lignosulfonate.

For the reduction of lignin and lignosulfonate by carbon monoxide, the reduction reaction may be catalyzed by a sulfur containing compound. The most preferred catalyst is a sulfide, such as hydrogen sulfide, which is added as a gas to the carbon monoxide blanket above the reduction reaction mixture at a partial pressure greater than about 50 psi, preferably greater than about 150 psi. An inorganic sulfide catalyst, such as sodium sulfide, may also be added to the reaction mixture in about a 1% to about 20% by weight concentration. A mixture of carbon monoxide and hydrogen may also be employed as a reducing agent. In this case, a catalyst mixture of hydrogen sulfide and an appropriate hydrogen catalyst seems to be the most effective.

Reaction time varies for the different reducing agents and catalysts and the amount of catalyst employed. In general, the hydrogen reduction reaction should be allowed to proceed at reaction temperature and pressure for a time period of about 30 minutes to about 5 hours and the carbon monoxide reduction for a time of about 15 minutes to about 2 hours.

If the reduction reaction is performed with an aqueous solvent, the oil soluble lignin phenols can be extracted from the reduction reaction mixture with an organic solvent. Preferred solvents are ether, diethyl ether, tetrahydrofuran, benzene and toluene.

One method of recovering the lignin phenols from the reaction product mixture is to filter the product mixture so as to separate the catalyst and any water insoluble solids from the water. Both parts, the aqueous solution and the insoluble solids are washed and extracted with the organic solvent. The two organic soluble fractions are then combined to produce a single organic soluble product. Substantially all of the lignin phenols produced by the reduction reaction will be in the organic solvent fraction.

The yield of lignin phenols from the reduction reactions with either hydrogen or carbon monoxide is dependent upon the reaction temperature. The conversion increases steadily as reaction temperature increases from about 200° C to about 350° C. Reaction pressure and reaction time above a certain minimum do not significantly affect the yield of lignin phenols from lignin as long as the reduction temperature is above about 200° C.

An analysis of the reaction products indicates that the lignin phenols produced from kraft lignins or lignosulfonates are very similar. This is true whether or not the reduction is carried out by hydrogenation or carbon monoxide. Higher hydrogen sulfide pressures lead to products with a lower oxygen content and a higher equivalent weight. The molecular weight of the lignin phenols produced by carbon monoxide reduction is substantially independent of reaction time or carbon monoxide or hydrogen sulfide pressure. An average molecular weight of about 250 to 300 grams per mole was determined for the lignin phenols of several carbon monoxide reduction runs.

The structure of the organic soluble products from the hydrogenations, the carbon monoxide reduction, whether or not catalyzed by hydrogen sulfide or other substances, has been verified to be a complex mixture of phenolic products derived from the lignin. It is believed to consist of two, three, or four or more, linked or fused, propane phenol units with assorted methoxyl and hydroxyl groups. Extensive loss of sulfur has occurred. Loss of phenolic and ether oxygen and substantial loss of methoxyl has also occurred.

The degree of agitation during the carbon monoxide reduction reaction also influences the product yield. Several carbon monoxide reduction runs were carried out comparing the percent yield achieved with a stirred pressure reactor vessel and a rocking autoclave. Percentage conversions went from 50% to a mid to high sixties percent product conversion when a stirred reactor was used. Elemental analysis and NMR analysis of the products from the stirred and rocker reactor vessel runs indicates that the degree of agitation influences the amount of demethoxylation.

After reduction, the lignin phenols must be made at least partially water soluble in order to function as surfactants. This can be done by one or a combination of several different reactions. The preferred reactions are alkoxylation by single or alternate blocks of ethylene oxide, propylene oxide, or butylene oxide, sulfonation, sulfation, sulfomethylation, alkylation, and alkoxysulfation. All of these reactions convert the lignin phenols to products that are surface active. Other modifications are of course possible with these lignin phenols to produce surfactant products.

Of the various ways to sulfate lignin phenols, two sulfation reactions are the most preferred. Excellent results have been achieved by sulfating with trimethylamine-sulfur trioxide complex ($Me_3NSO_3$) and by sulfating with chlorosulfonic acid ($ClSO_3H$) in an anhydrous reaction media. Both of these reactions convert the phenolic hydroxyl of the lignin phenol to a sulfate ester. Interfacial tension values have been measured equal to or better than many existing commercial surfactants sold for enhanced oil recovery purposes. Although typical lignosulfonates or modified kraft lignin have interfacial tension values of about 5000 mdynes/cm, sulfated lignin phenols have interfacial tension values below 1000 mdynes/cm and often below 500 mdynes/cm.

Sulfation with trimethylamine-sulfur trioxide complex requires the addition of sodium hydroxide, sodium carbonate, and sodium bicarbonate to achieve substantial conversion. For best results, it is preferred to add about 0.5 to about 2 equivalents of sodium hydroxide, about 0.5 to about 2 equivalents of sodium carbonate, and about 0.5 to about 2 equivalents of sodium bicarbonate to the sulfation reaction mixture for each equivalent of lignin phenol.

Excellent results have been achieved by mixing about 40 milliequivalents of lignin phenol with about 40 milliequivalents each of sodium hydroxide and sodium bicarbonate, about 20 milliequivalents of sodium carbonate, and about 60 milliequivalents of trimethylamine-sulfur trioxide complex in 20 milliliters of water. The reaction was maintained at 45° to 50° C. for about 10 to 20 hours. The unreacted lignin phenol was removed by ether extraction.

The trimethylamine-sulfur trioxide complex and the chlorosulfonic acid used in preparing lignin phenol sulfates produced a large amount of undesirable sodium sulfate as a by-product. For example, in a typical reaction of a lignin phenol with trimethylamine-sulfur trioxide complex, the composition of the reaction mixture was about 65% lignin phenol sulfate and about 25% sodium sulfate. This large amount of sodium sulfate would be detrimental to a surfactant formulation in a connate reservoir brine. Divalent ions such as calcium and magnesium precipitate as calcium sulfate or magnesium sulfate when mixed with a surfactant formulation containing sodium sulfate. Reservoir plugging can result.

A procedure was developed to remove the sodium sulfate. A 1/1 to 2/1 mixture of isopropanol and water was used to remove sodium sulfate by precipitation. Since only the sodium sulfate is insoluble, other inorganic salts and sulfated lignin phenols are soluble in this solvent mixture. This procedure allowed the removal of more than 95% of the sodium sulfate as determined by ion chromatography.

The procedure followed for the sulfation reaction with chlorosulfonic acid was to dissolve about 40 milliequivalents of the lignin phenol in 30 milliliters of anhydrous ether and then slowly add about 80 milliequivalents of chlorosulfonic acid at 10° C. The reaction mixture was allowed to proceed to completion for about two hours. It was then hydrolyzed, neutralized with sodium hydroxide, and the sulfated lignin phenol product extracted into water.

The lignin phenols may also be sulfonated to transform the product into a surfactant. A preferred sulfonation method is to sulfomethylate the lignin phenol with formaldehyde and sodium sulfite or sodium bisulfite. The sulfomethylation reaction adds the sulfomethylene group ($-CH_2SO_3Na$) to the lignin phenol. Sulfuric acid, sulfur trioxide, or sulfur trioxide-dioxane complex may also be used to sulfonate the lignin phenol.

Alkoxylation is a highly successful method for producing water soluble surfactants having low interfacial tensions. Ethoxylation and propoxylation are especially preferred. Butyoxylation is another possible reaction. Ethoxylated or propoxylated lignin phenols having about 4 to about 20 alkylene oxide groups have been found to be effective surfactants. The sulfation or sulfonation of these same ethoxylated, or propoxylated lignin phenols having about 4 to about 20 alkylene oxide groups also produces highly effective surfactants. Other combinations proved effective include alkoxylation with blocks of two different alkylene oxides, and alkoxylation followed by sulfonation or sulfation.

The lignin phenols may be alkylated to raise their molecular weight and hydrophobicity. Preferred alkylation procedures include Friedel Crafts alkylation with alkenes and Lewis acids such as aluminum chloride, and Mannich reactions involving formaldehyde and organic amines. Alkylation may also be followed by sulfonation or sulfation.

SURFACTANT FLOODING SYSTEMS

The invention also includes the injection of a surfactant flooding system into a reservoir to recover underground hydrocarbons, where the surfactant flooding system contains lignin surfactants produced by the above described process. Depending upon the surfactant formulation, some of these lignin surfactants may be employed as sole surfactants, co-surfactants, or solubilizers in a surfactant flooding system. They may also be used to substitute for a certain percentage of an existing surfactant in a surfactant flooding system to lower the overall cost of the surfactants employed in the flooding system. Many of the lignin surfactants produced according to the above described process provide extremely low interfacial tensions between oil and water, and also form stable surfactant systems with many of the commercially available enhanced oil recovery surfactants now on the market.

It is well known that conventional surfactant flooding mixtures are usually composed of one or more petroleum, petrochemical or synthetic sulfonates, a solubilizer or cosurfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 20% of the pore volume of the reservoir with a total surfactant and solubilizer concentration of about 0.1% to about 10% by weight. A typical surfactant system may be:

1. one or more petroleum sulfonates such as
   (a) a water soluble sulfonate having a relatively low equivalent weight, and
   (b) an oil soluble sulfonate having a relatively high equivalent weight, or
   (c) any other commercially available petroleum sulfonates;
2. a solubilizer or cosurfactant;
3. brine; and
4. optionally, a light hydrocarbon.

As mentioned before, surfactant flooding systems can be formulated under some conditions without a solubilizer and with only a sole surfactant. Petrochemical and synthetic sulfonates may be substituted for petroleum sulfonates. The surfactant slug may also contain or be preceded by a sacrificial agent. The present invention resides in the use of about 0.1% to about 10% concentration by weight of lignin surfactants in any surfactant flooding system to recover underground hydrocarbons, wherein the lignin surfactants are prepared according to the described process.

Surfactant systems are generally pushed through the formation towards a production well by the subsequent injection of a drive fluid. The drive fluid is usually water, gas, or water viscosified by a polymer. Hydrocarbons and other polymers are then recovered at one or more production wells.

The following examples will further illustrate the method of the present invention wherein surfactants are prepared from lignin or the method of injecting a surfactant flooding solution containing such lignin surfactants. These examples are given by way of illustration and not as limitations on the scope of the invention. Thus, it should be understood that reaction steps and amounts may be varied with the process still remaining within the scope of the invention.

EXAMPLES

The reduction reaction runs were performed in high pressure, high temperature reactors. Several different lignins were employed in the experimental runs. Indulin C is a trademarked pine kraft lignin product sold by Westvaco Corp. It is a spray dried powder comprising 72% lignin and the remainder inorganic salts and hemicellulose. Indulin AT is a trademarked purified Indulin C sold by Westvaco Corp. with a lignin content of 93%. A third kraft lignin employed was a noncommercial product obtained from Reed Lignin Co. which is representative of kraft lignins. It had a lignin content of 72% and contained residual sodium hydroxide from the pulping process.

Lignosulfonates used included Lignosite 458, a trademarked desugared sodium lignosulfonate sold by Georgia Pacific Corp. and Lignosite, a trademarked desugared calcium lignosulfonate sold by Georgia Pacific Corp. Orzan LS-50 is a trademarked sodium lignosulfonate sold by ITT Rayonier Co. that is desugared with a bisulfite cooking process. It has a lignin content of 59%. Lignosol X is a trademarked sodium lignosulfonate sold by Reed Lignin Co. The Lignosol X is not desugared and has a lignin content of 54%.

Commercial surfactants used in the Examples were TRS-18, TRS-40 and LN-60COS. TRS-18 is a trademarked oil soluble surfactant having an equivalent weight of about 520 sold by Witco Chemical Co. TRS-40 is a trademarked water soluble surfactant having an equivalent weight of about 350 formerly sold by Witco Chemical Co. LN-60COS is a sulfated derivative of ethoxylated alcohol having approximately 12 to 14 carbon atoms with about 6 units of ethylene oxide and an equivalent weight of about 550 prepared by Texaco Chemical Co.

EXAMPLES 1–7

Lignin Phenols By Hydrogen Reduction

Tables 1 and 2 list seven kraft lignin hydrogenations using a Raney Nickel catalyst. Examples 1–6 were run with Indulin C and Example 7 was run with Indulin AT. The hydrogenations were done in water with a total lignin solids concentration of 12.5%. Raney Nickel and sodium hydroxide were each used at a 10% by weight concentration based on the lignin.

After the lignin solution and catalyst were placed in the 1-gallon reactor, the reactor was pressurized with hydrogen to the initial pressure shown in Table 1. The reactor was then heated. The reaction mixture was held at the specified reaction temperature for the indicated time, and then allowed to cool. Hydrogen consumption was determined by the decrease in reactor pressure.

The reaction samples were taken from the reaction vessel, and extracted with diethyl ether to remove the ether soluble product. The yields were totaled to give an accounting of the total solids and organic liquids in the reaction. This "mass balance" is a determination of the amount of material that can be accounted for after the reaction. For instance, a mass balance of 95% means that 5% of the material is missing. It was presumably converted to gas or water.

The percent yield of lignin product in Table 2 was adjusted to account for the lignin content of the starting lignin. In Example 6 for instance, 9.8 grams of ether soluble product was isolated from the product of the hydrogenation of 50 grams of Indulin C. As Indulin C is 72% lignin, the 50 grams of Indulin C corresponds to 36 grams of kraft lignin. The percent yield is then 9.8 grams divided by 36 grams, or 27%.

The Example 1–7 runs showed a general trend of increasing hydrogen consumption as the reaction temperature increased. This is reinforced by Table 2 which indicates that the lignin phenol (ether soluble product) yield increased as temperature increased.

Examples 1–7 in Tables 1 and 2 also illustrate a clear correlation between higher reduction temperatures and higher yields of lignin phenols. Temperature was the only variable that substantially influenced the yield of the lignin phenol products. Reaction time and hydrogen pressure did not have a substantial effect on product yield at the temperature studied. The use of 20% Raney Nickel as a catalyst instead of 10% Raney Nickel did not affect the product yield but did lower the mass balance significantly.

TABLE 1

KRAFT LIGNIN HYDROGENATIONS WITH 10% RANEY NICKEL

| Example | Reaction Temp. (°C.) | Lignin | Time At Reaction Temperature (Hours) | Initial H$_2$ Pressure (psi) |
|---|---|---|---|---|
| 1 | 190 | Indulin C | 10 | 800 |
| 2 | 198 | Indulin C | 3 | 1800 |
| 3 | 240 | Indulin C | 2 | 1370 |
| 4 | 245 | Indulin C | 8 | 1800 |
| 5 | 300 | Indulin C With 20% Raney Nickel | 2 | 1200 |
| 6 | 350 | Indulin C | 2 | 1500 |
| 7 | 350 | Indulin AT | 2 | 1500 |

TABLE 2

PRODUCT YIELDS FOR KRAFT LIGNIN HYDROGENATIONS

| Example | Reaction Tem. (°C.) | % Yield of Lignin Phenol Product[1] | Product Ratio Ether Soluble:Insoluble | | % Mass Balance |
|---|---|---|---|---|---|
| 1 | 190 | 4 | 3 | 97 | 100 |
| 2 | 198 | 4 | 3 | 97 | 100 |
| 3 | 240 | 8 | 6 | 94 | 95 |
| 4 | 245 | 9 | 7 | 93 | 88 |
| 5 | 300 | 17 | 21 | 79 | 58 |
| 6 | 350 | 27 | 17 | 83 | 96 |
| 7 | 350 | 21 | 22 | 78 | 74 |

[1]Based on the lignin purity; for Indulin C = 72%; for Indulin AT = 93%.

EXAMPLES 8–10

Reduction Control Reactions

Three high temperature, high pressure runs were performed as Examples 8–10 in the absence of catalyst and hydrogen for control runs. Table 3 indicates that the Examples 8–10 yields of lignin phenol products were substantially lower than in the catalyzed hydrogenation reductions of Examples 1–7. These results show the necessity of using a reducing agent such as hydrogen or carbon monoxide in direct contrast to a published report that alkali lignins produce high yields (40%) of simple phenolics and ether soluble products in a neutral hydrolysis reaction. See, Benigni, J. D. and Goldstein, I. S., J. Polymer Science., Part C., p. 467–75, 477–78 (1971).

TABLE 3

HIGH TEMPERATURE CONTROL REACTIONS FOR KRAFT LIGNIN

| Example | Reaction Temp. (°C.) | % Yield of Lignin Phenol Product | Product Ratio Ether Soluble:Insoluble | | % Mass Balance |
|---|---|---|---|---|---|
| 8 | 300 | 6 | 4 | 96 | 89 |
| 9 | 350 | 9 | 8 | 92 | 70 |
| 10[1] | 350 | 7 | 9 | 91 | 67 |

[1]Reaction used Indulin AT; the other reactions used Indulin C.

EXAMPLES 11–13

Hydrogen Reduction of Modified Lignin

Additional hydrogenations of kraft lignin were performed wherein modified Indulin C was employed. Samples of alkaline cooked and alkaline cooked, ozonized Indulin C were employed in Examples 11–13. The Examples indicated a reduced reactivity and lower yield of lignin phenol product as compared to the reduction of unmodified Indulin C illustrated by previous examples.

The Example 13 reaction was performed with a copper chromite catalyst, Harshaw Cu-1106P, a trademarked catalyst sold by Harshaw Chemical Co. Substantial loss of material occurred during the reaction which prevented the determination of reliable yields.

TABLE 4

HYDROGENATIONS OF ALTERED KRAFT LIGNIN (INDULIN C)

| Example | Lignin Modification | Catalyst | Reaction Temp. (°C.) | % Yield of Lignin Phenol Product | % Mass Balance |
|---|---|---|---|---|---|
| 11 | Alkaline Cook | Ni (Raney) | 300 | 6 | 81 |
| 12 | Ozonized, Alkaline Cook | Ni (Raney) | 300 | 8 | 78 |
| 13 | none | Harshaw Cu-1106P | 275 | — | 32 |

EXAMPLES 14-15

Hydrogen Reduction of Lignosulfonate

Two hydrogen reduction runs were performed with $Fe^{+2}$ Lignosite lignosulfonate. These two examples used 120 grams of iron lignosulfonate and 400 milliliters of water. No additional catalyst was added. Reaction time was two hours at 350° C. for both runs. The yield of ether soluble product (lignin phenol) was insignificant without hydrogen in Example 15. Example 14 with hydrogen provided a good yield of lignin phenol product.

TABLE 5

PRODUCT YIELDS FOR IRON LIGNOSULFONATE REACTIONS

| Example | Initial $H_2$ Pressure (psig) | % Yield of Lignin Phenol Product | Product Ratio Ether Soluble:Insoluble | | % Mass Balance |
|---|---|---|---|---|---|
| 14 | 1000 | 33 | 42 | 58 | 55 |
| 15 | none | 1 | 1 | 99 | 71 |

EXAMPLES 16-26

Lignin Phenols By Carbon Monoxide Reduction

The carbon monoxide reductions were performed in a Hastelloy C stirred reactor. The lignin material was either slurried or dissolved in 400 milliliters of water and added to the reactor. A larger volume of water was used for Examples 25 and 26. Carbon monoxide and hydrogen sulfide were used to pressure up the reactor to the initial listed pressure. The reactor was heated to the specified temperature and held there for the selected reaction time. Separation and analysis of the reaction products followed the procedure of the previous hydrogen reduction examples.

Examples 24 and 25 were run with slurried lignin. The kraft lignin did not dissolve since the solutions did not contain sodium hydroxide. In all other runs, sufficient sodium hydroxide was present to completely dissolve the lignin.

TABLE 6

REACTION CONDITIONS AND MASS BALANCE FOR AQUEOUS KRAFT LIGNIN REDUCTIONS WITH CO AT 350° C.[1]

| Example | Lignin | Weight (grams) | NaOH, % | Reaction Time (min.) | Initial Pressure, (psig) CO | Initial Pressure, (psig) $H_2S$ | % Mass Balance |
|---|---|---|---|---|---|---|---|
| 16 | Ind. C | 100 | 10 | 15 | — | — | 81 |
| 17 | Inc. C | 60 | 1 | 15 | 1000 | — | 69 |
| 18 | Ind. C | 60 | 1 | 120 | 1000 | — | 56 |
| 19 | Ind. AT | 454 | 10 | 30 | 1000 | — | 63 |
| 20 | Ind. AT | 454 | 10 | 30 | 655 | — | 57 |
| 21 | Ind. AT | 60 | 8 | 30 | 550 | 100[2] | 61 |
| 22 | Ind. AT | 60 | 8 | 15 | 1000 | 100 | 70 |
| 23 | Ind. AT | 120 | 10 | 30 | 1000 | 240 | 65 |
| 24 | Ind. AT | 60 | — | 25 | 900 | 200 | 65 |
| 25 | Ind. AT | 120 | — | 60 | 800 | 245 | 67 |
| 26 | Reed | 120 | 8 | 120 | 800 | 245 | 70 |

[1] All reactions conducted at 350° C. except for Example 19 at 410° C. and Example 20 at 450° C.
[2] 550 psi $H_2$ was also used.

TABLE 7

PRODUCT DISTRIBUTION AND YIELDS FOR EXAMPLES 16-24

| Example | Lignin | Reaction Time (min.) | Initial Pressure (psig) CO | Initial Pressure (psig) $H_2S$ | Product Ratio Ether Soluble:Insoluble | | Lignin Phenols Yield, %[1] | Lignin Phenols Conversion, %[2] |
|---|---|---|---|---|---|---|---|---|
| 16 | Ind. C | 15 | — | — | 3 | 97 | 2 | 4 |
| 17 | Ind. C | 15 | 1000 | — | 39 | 61 | 27 | 45 |
| 18 | Ind. C | 120 | 1000 | — | 53 | 47 | 30 | 54 |
| 19 | Ind. AT | 30 | 1000 | — | 72 | 28 | 49 | 72 |
| 20 | Ind. AT | 30 | 655 | — | 66 | 34 | 41 | 59 |
| 21 | Ind. AT | 60 | 550[3] | 100 | 70 | 30 | 44 | 62 |
| 22 | Ind. AT | 15 | 1000 | 100 | 67 | 33 | 50 | 61 |
| 23 | Ind. AT | 30 | 1000 | 240 | 71 | 29 | 51 | 71 |
| 24 | Ind. AT | 25 | 900 | 200 | 90 | 10 | 59 | 77 |
| 25 | Ind. AT | 60 | 800 | 245 | 84 | 16 | 56 | 70 |
| 26 | Reed | 120 | 800 | 245 | 58 | 42 | 43 | 75 |

[1] Based on total solids of lignin feedstock charged to the reactor.
[2] Based on the amount of pure lignin converted to product.
[3] 550 psi $H_2$ also used.

The mass balance column of Table 6 shows consistent recovery of 60% to 80% of the total solids in the reaction. The missing material was converted to either water or gaseous products.

The percentage yields of Table 7 are based on the total solids of lignin feedstock charged to the reactor. The percentage conversions are based on the amount of lignin converted to product. Since Indulin C is 72% lignin, 100 grams of Indulin C provides 72 grams of lignin as a starting product. A 50% conversion means that 36 grams of the starting 72 grams of lignin was converted to product.

The use of carbon monoxide alone causes over a ten fold increase in the percent yield of lignin phenols relative to reactions without carbon monoxide. These yields are comparable to to 21% to 27% yields obtained for the Raney Nickel catalyzed hydrogenation of kraft lignin discussed previously. However, the extent of conversion of lignin to lignin phenol is higher for the carbon monoxide reactions than for the hydrogenations. In the hydrogenations, conversions of 21% to 31% were found compared with the about 45% to 72% shown in Table 7. The carbon monoxide reductions give higher conversions because the lignin phenol products are more extensively deoxygenated. Higher reaction temperatures lead to higher yields of lignin phenol products.

The addition of hydrogen sulfide to the reduction reaction as a catalyst causes an additional increase in the conversion of lignin to product. There is a correlation between higher hydrogen sulfide pressure and the percent conversion to product. The effect of added hydrogen sulfide is independent of reaction time or carbon monoxide pressure as Example 21 used 550 psig carbon monoxide, and this is half the amount used in Example 22. Both Examples 21 and 22 employed 100 psig hydrogen sulfide.

The yields and conversions of Examples 24 and 25, the slurried reactions, were the same as the solution reactions of the other examples. This illustrates it is not necessary for the lignin to be dissolved in order to get a good product yield.

EXAMPLES 27-34

Carbon Monoxide Reduction of Lignosulfonate

These carbon monoxide reduction runs were made with three different commercial sodium lignosulfonates. They were: Lignosite 458, Orzan LS-50, and Lignosol X. Example 27 served as a control reaction. Lignin weight, reaction time and initial gas pressures were all varied in these runs illustrated in Table 8. Each of the carbon monoxide reduction runs contained 1% sodium hydroxide based on lignin weight, after the pH of the solutions was adjusted to neutral. The lignosulfonates were completely dissolved in all of these Examples.

yield of Example 33 when compared to Examples 32 and 34 with 120 grams of reacted lignosulfonate. Higher yields occurred at higher temperatures in the carbon monoxide reduction examples.

Examples 27-34 have high conversions of lignin to lignin phenols, but their overall yields were low. This is due to the fact that commercial lignosulfonates are only about 50% lignin. The remaining 50% is about equally divided between carbohydrates and inorganic salts. Furthermore, the carbon monoxide reduction reaction desulfonates the sodium lignosulfonate. This causes the maximum theoretical yield from a hypothetically pure sodium lignosulfonate to be about 75%. This combination of lack of purity and loss of sulfonate means the maximum yield from a commercial lignosulfonate that is 50% lignin would be about 37.5%.

An increase in either reaction temperature or hydrogen sulfide pressure caused significant increases in the conversion to lignin phenols. This is shown quite graphically with Examples 29 and 30, and Examples 32 and 34 in Table 8.

Ether soluble products (lignin phenols) were characterized by several analytical techniques, including elemental analysis (carbon, hydrogen, and sulfur), functional group analysis (methoxyl determinations and weak acid titrations), infrared analysis, high performance liquid chromatography, and vapor pressure osmometry. These analyses determined the structural changes that occurred during the reactions.

All of the analytical techniques indicated that lignosulfonates and kraft lignins yield similar products upon reduction by hydrogen or carbon monoxide. Second, the amount of sulfur in the lignin phenol product is directly related to the amount of hydrogen sulfide used in the carbon monoxide reduction. Higher hydrogen sulfide pressures yield products with higher sulfur content. Third, the presence of hydrogen sulfide as a catalyst or higher reaction temperatures causes the equivalent weight of the product to be higher. Fourth, higher reaction temperatures also yield lower molecular weight lignin phenols.

TABLE 8

PRODUCT DISTRIBUTION AND YIELDS FOR AQUEOUS LIGNOSULFONATE REDUCTION WITH CO AT 350° C.[1]

| Ex. | Lignin | Weight (grams) | Reaction Time (min.) | Initial Pressure (psig) CO | Initial Pressure (psig) $H_2S$ | Product Ratio Ether Soluble:Insoluble | | Lignin Phenols Yield, %[2] | Lignin Phenols Conversion %[3] |
|-----|--------|----------------|----------------------|----------------------------|----------------------------|---------------------------------------|---|------------|------------|
| 27 | Iron Lig. | 120 | 120 | — | — | 1 | 99 | 0.1 | 1 |
| 28 | Lig. 458 | 60 | 120 | 1000 | — | 42 | 58 | 15 | 42 |
| 29 | Lig. 458 | 454 | 30 | 1000 | — | 47 | 53 | 29 | 88 |
| 30 | Lig. 458 | 454 | 30 | 1000 | — | 44 | 56 | 23 | 68 |
| 31 | Lig. 458 | 60 | 30 | 1000 | 100 | 50 | 50 | 24 | 66 |
| 32 | Lig. 458 | 120 | 30 | 900 | 200 | 55 | 45 | 31 | 82 |
| 33 | Orzan LS-50 | 180 | 60 | 755 | 245 | 19 | 81 | 13 | 42 |
| 34 | Lig. X | 120 | 30 | 700 | 245 | 47 | 53 | 26 | 83 |

[1]All reactions conducted at 350° C. except for Example 29 at 410° C. and Example 30 at 440° C.
[2]Based on total solids of lignin feedstock charged to the reactor.
[3]Based on the amount of lignin converted to product.

Most of the figures for percentage mass balance were in the 50% range, with Example 27 and Example 33 at 70%, indicating that a significant portion of each lignin product was converted to either water or gaseous product.

The reactions all showed a pronounced effect of carbon monoxide and hydrogen sulfide on the yield of the reaction. Example 33 with Orzan LS-50 contained too much lignin (180 grams) for the charge of carbon monoxide and hydrogen sulfide. This explains the low

EXAMPLES 35-40

Molecular Weights of Lignin Phenols

Vapor pressure osmometry was used to determine molecular weights for many of the lignin phenol products. This technique measures a difference in osmotic pressure between a pure solvent and a solution of a solute in the same solvent. The pressure is directly dependent upon the total number of particles (ions and molecules) dissolved in the solvent.

A Knauer Vapor Pressure Osmometer was used for this work. Dioxane or tetrahydrofuran was the solvent and the cell temperature was 60° C., or 45° C., respectively. The calibration standard was benzil at 210.22 grams per mole. Two determinations were made for each lignin phenol to insure linear behavior. The results are shown in Table 9 along with equivalent weight data from weak acid titrations.

TABLE 9

MOLECULAR WEIGHT DETERMINATIONS ON LIGNIN PHENOLS BY VAPOR PRESSURE OSMOMETRY

| Example | Sample From Example No. | Source of Lignin Phenol | $\overline{M}_n$, g/mol | Eq. Wt., g/eq |
|---|---|---|---|---|
| 35 | 18 | Indulin C/CO/350° C. | 340 | 260 |
| 36 | 22 | Indulin AT/CO + H$_2$S/350° C. | 270 | 230 |
| 37 | 20 | Indulin AT/CO/450° C. | 235 | 350 |
| 38 | 24 | Indulin AT/CO + H$_2$S/350° C. | 290 | 260 |
| 39 | 32 | Lignosite 458/CO + H$_2$S/350° C. | 270 | 290 |
| 40 | 30 | Lignosite 458/CO/440° C. | 220 | 310 |

The number average molecular weight and equivalent weight values in Table 9 illustrate two trends. Lignin phenol products with lower molecular weights are formed either at higher reaction temperatures or in reactions involving hydrogen sulfide. Products with higher equivalent weights are formed at higher reaction temperatures due to more extensive deoxygenation of the lignin.

Propane phenol, the repeating unit in lignin, has a molecular weight of 136 grams per mole. This means that the average lignin phenol produced with the invention process is composed of two, three or four or more propane phenols plus assorted methoxyls, hydroxyls, and other oxygens to reach the average molecular weights identified in Table 9.

EXAMPLES 41–56

Sulfation of Lignin Phenols

The lignin phenol products produced by the invention process are surfactant precursors. Lignin surfactants can be prepared by subjecting the lignin phenols to one or more reactions of sulfation, sulfonation, alkoxylation, alkylation, sulfomethylation, and alkoxysulfation. These reactions are performed on the phenolic hydroxyl groups, the aromatic rings, and hydroxyl groups.

Sulfation forms a highly polar group ($-SO_4^-Na^+$) that increases the water solubility of the lignin phenol products. Two available reagents for sulfation are chlorosulfonic acid and trimethylamine-sulfur trioxide complex. Examples 36 through 50 were sulfated by trimethylamine-sulfur trioxide complex, except for Examples 38 and 50 which were sulfated with chlorosulfonic acid.

The reaction procedure for sulfating with trimethylamine-sulfur trioxide complex was to mix 40 milliequivalents of lignin phenol product with 50 milliequivalents each of sodium hydroxide and sodium carbonate, along with 20 milliequivalents of sodium bicarbonate and 60 milliequivalents of trimethylamine-sulfur trioxide complex in 20 milliliters of water. After about 10 to about 20 hours at 45° to 50° C., the reaction reached completion.

The unreacted lignin phenol was removed by ether extraction.

The reaction procedure with chlorosulfonic acid was to dissolve 40 milliequivalents of the lignin phenol product in 30 milliliters of anhydrous ether and slowly add 80 milliequivalents of chlorosulfonic acid at 10° C. The reaction was allowed to proceed to completion for two hours. The excess was then hydrolyzed, neutralized with sodium hydroxide, and the product extracted into water.

The progress of each reaction was followed by reverse phase High Performance Liquid Chromatography (HPLC) on a Waters Bondapak Phenyl Column. After the completion of the reaction and the extraction of unreacted lignin phenol, the purity of the product was checked by HPLC. This verified that all unreacted lignin phenol had been removed from the aqueous solution of the sulfated product. Reduction conditions and sulfation yields of Examples 41–56 are reported in Table 10.

TABLE 10

PREPARATION OF SULFATED LIGNIN PHENOLS[1]

| Example | Source of Lignin Phenol[2] | | Example | Yield |
|---|---|---|---|---|
| | Lignin | Gases[3] | | |
| 41 | Indulin C[4] | H$_2$ | | 90 |
| 42 | Indulin C | H$_2$ | 6 | 66 |
| 43 | Indulin AT | H$_2$ | 7 | 36 |
| 44 | Indulin C | CO | 18 | 64 |
| 45 | Iron Lignosite | H$_2$ | 14 | 82 |
| 46 | Lignosite 458 | CO | 28 | 73 |
| 47 | Indulin C[5] | H$_2$ | | 69 |
| 48 | Indulin AT | — | Control[6] | 100 |
| 49 | Indulin AT | CO, H$_2$S (100) | 22 | 74 |
| 50 | Indulin AT | CO, H$_2$S (240) | 23 | 58 |
| 51 | Lignosite 458 | CO, H$_2$S (100) | 31 | 66 |
| 52 | Indulin AT | CO, H$_2$S (200) | 24 | 78 |
| 53 | Indulin AT | CO | * | 94 |
| 54 | Lignosite 458 | CO, H$_2$S (200) | 32 | 71 |
| 55 | Indulin AT | CO H$_2$S (245) | 25 | 88 |
| 56 | Indulin AT | CO[7] | 20 | 75 |

[1]The sulfation reagent was Me$_3$NSO$_3$, except for Examples 38, 50, and 56 where it was ClSO$_3$H.
[2]Reaction temperature was 350° C. unless noted.
[3]Number in parentheses is the pressure of H$_2$S in psi.
[4]Reaction temperature = 300° C.
[5]Reaction temperature = 250° C.
[6]Control reaction with kraft lignin (not a lignin phenol).
[7]Reaction temperature = 450° C.
*Lignin phenol prepared in stirred reactor for 1 hours at 350° C. Product ratio of ether soluble:insoluble was 63:37; Reaction had a 53% yield and a 68% conversion.

The sulfation yields were generally moderate to good for the reactions of Examples 41–56. Example 43 which used chlorosulfonic acid as the reagent gave a low yield. Changing the solvent to a diethyl ether-tetrahydrofuran mixture substantially raised the yield in the chlorosulfonic acid reaction.

EXAMPLES 57–76

Sulfated Lignin Phenols

The sulfation products of Examples 41–56 were evaluated for enhanced oil recovery surface activity by performing interfacial tension (IFT) measurements. The sulfated lignin phenols were formulated as 1% or 2% product solids in synthetic field brine. IFT measurements were made versus toluene and a mid-Continent crude oil having a viscosity of about 12 centipoise. The brine used in the formulations had a salinity of 35,000 ppm TDS and a divalent ion concentration of 560 ppm ($Ca^{+2}$ and $Mg^{+2}$).

The equivalent weights given in Table 11 are based on the weak acid titration data for each lignin phenol. The sulfated products are grouped by type of reaction and source of lignin. The IFT values ranged from 280 to 1700 mdyne/cm against crude oil and from 25 to 2100 mdyne/cm versus toluene. This indicates moderate surface activity, especially when compared to the Example 43 control of sulfated kraft lignin, with an interfacial tension always greater than 4600 mdyne/cm.

EXAMPLES 77–83

Corefloods With Sulfated Lignin Phenols

Lignin phenols were evaluated for their enhanced oil recovery potential in corefloods. The general procedure was to cut berea sandstone into 2 inch×2 inch×12 inch cores and cast the cores in an epoxy mold. Each core was evacuated by vacuum pump and saturated with a simulated field injection brine having 68,000 ppm TDS. The cores typically had a 150 ml pore volume, a porosity of 0.21–0.22 and a permeability of 250–500 millidarcies.

TABLE 11

EQUIVALENT WEIGHTS AND IFT VALUES FOR LIGNIN PHENOL SULFATES

| | | | | IFT Values (mdynes/cm)[2] | | |
|---|---|---|---|---|---|---|
| | | | | Crude Oil | | Toluene |
| Ex. | Source of Lignin Phenol[1] | Ex. Source of Sulfate | Eq. Wt. g/Eq. | Initial | 1-Hour | Initial | 1-Hour |
| 57 | Indulin C/$H_2$(250° C.) | 47 | 340 | 1800 | 1700 | 950 | 750 |
| 58 | Indulin C/$H_2$(300° C.) | 41 | 300 | 1700 | 1600 | 3400 | 1500 |
| 59 | Indulin C/$H_2$ | 42 | 420 | 420 | 390 | 670 | 380 |
| 60 | Indulin AT/$H_2$ | 43 | 390 | 430 | 610 | 690 | 600 |
| 61 | Iron Lignosite/$H_2$ | 45 | 340 | 1100 | 1300 | 3000 | 1400 |
| 62 | Indulin AT/CO(325° C.) | 53 | 310 | — | 1100 | — | 2100 |
| 63 | Indulin C/CO | 44 | 360 | 360 | 450 | 520 | 260 |
| 64 | Indulin AT/CO(450° C.) | 56 | 353 | — | 580 | — | — |
| 65 | Ind. At/CO + $H_2S$(100 psi) | 49 | 360 | 840 | 1100 | 1300 | 980 |
| 66 | Ind. AT/CO + $H_2S$(240 psi) | 50 | 420 | 200 | 280 | 300 | 270 |
| 67 | Ind. AT/CO + $H_2S$(200 psi) | 52 | 380 | 450 | 690 | 1100 | 800 |
| 68 | Ind. AT/CO + $H_2S$(245 psi) | 55 | 350 | 510 | 590 | 360 | 25 |
| 69 | Lignosite 458/CO | 46 | 300 | 590 | 780 | 420 | 320 |
| 70 | Lig. 458/CO + $H_2S$(100 psi) | 51 | 380 | 440 | 540 | 380 | 350 |
| 71 | Lig. 458/CO + $H_2S$(200 psi) | 54 | 390 | 330 | 400 | 520 | 480 |
| 72 | Indulin AT (Control) | 48 | — | 4800 | 4600 | 8500 | 6700 |
| 73 | Witco TRS-40 | — | — | 83 | 180 | 19 | 14 |
| 74 | LN-60COS | — | — | 500 | 980 | 720 | 560 |
| 75 | Ex. 53/TRS-40[3] | — | — | 150 | 320 | — | — |
| 76 | Witco TRS-18 | — | — | Unstable | — | — | — |

[1]The reaction temperature was 350° C. unless other indicated.
[2]1% in synthetic field brine.
[3]1% each.

The IFT values of two commercial surfactants previously used in surfactant flooding systems (TRS-40 and LN-60COS) were found to be comparable to the IFT values of several of the sulfated lignin phenols. Thus, it can be expected that the lignin phenol sulfates will perform well in enhanced oil recovery surfactant floods.

Table 11 also indicates a general trend of higher equivalent weight products having a lower IFT value. Thus, it can be predicted that increasing the equivalent weight of the lignin phenol sulfates should increase IFT values. Previously discussed correlations provide two ways to increase equivalent weight. Increases in reaction temperature generally gave lignin phenol products with higher equivalent weights. Increases in the amount of hydrogen sulfide used to catalyze the carbon monoxide reduction reaction also gave increases in equivalent weights.

Each core was flooded at a frontal advance rate of 10 feet per day with an Illinois crude oil having a density of 0.84 grams per milliliter and a viscosity of 6.4 centipoise. Flooding with the oil continued until water production ceased. Each core was then flooded with the synthetic field brine at a rate of 5 feet per day until water flood residual oil saturation was reached.

The surfactant slug was comprised of a 0.2 pore volume slug of 2% active sulfated lignin phenol in a blend of 20% synthetic field brine and 80% fresh water. It was followed by a continuous polymer drive of 1500 ppm polyacrylamide having a 150 centipoise viscosity in fresh water. Injection rate for the chemical flood was 1 foot per day. Polymer injection continued until oil production stopped.

All core floods were performed at approximately 75° F. A low pressure of less than 5 psi was observed during surfactant injection. Pressure increased during polymer injection to 80–100 psi.

TABLE 12

SINGLE SURFACTANT COREFLOODS WITH SULFATED LIGNIN PHENOLS

| Example | Lignin Phenol Feedstock | Lignin Phenol Synthesis Conditions | IFT (mdynes/cm) | $E_R$, % |
|---|---|---|---|---|
| 77 | Kraft Lignin | CO/345° C. | 1452 | 16 |
| 78 | Lignosulfonate | CO + $H_2S$ (200 psi)/350° C. | 796 | 21, 18[1] |
| 79 | Kraft Lignin | CO + $H_2S$ (240 psi)/350° C. | '673 | 19 |
| 80 | Kraft Lignin | CO + $H_2S$ (100 psi)/350° C. | 1541 | 16 |
| 81 | Kraft Lignin | CO + $H_2S$ (240 psi)/310° C. | | 18 |
| 82 | Lignosulfonate | CO + $H_2S$ (200 psi)/310° C. | | 16 |

TABLE 12-continued

SINGLE SURFACTANT COREFLOODS WITH SULFATED LIGNIN PHENOLS

| Example | Lignin Phenol Feedstock | Lignin Phenol Synthesis Conditions | IFT (mdynes/cm) | $E_R$, % |
|---|---|---|---|---|
| 83 | Coreflood Without Surfactant | | | 6 |

[1]Duplicate run under identical conditions.

The corefloods of Examples 77–83 illustrated in Table 12 indicate that sulfated lignin phenols can recover up to 21% of water flood residual oil when used alone as primary surfactants. These are good recoveries for single surfactant systems. Second, the performance of the sulfated lignin phenol systems was not affected by the lignin feedstock used. Third, the performance of the sulfates was not sensitive to the lignin phenol synthesis conditions.

The sulfate products used in Examples 77 and 78 were also used in corefloods at higher salinity levels of 34,000 ppm TDS. Recovery efficiency was not substantially affected by the increase in salinity. The same sulfate products of Examples 77 and 78 were used in corefloods with concentrations of 4%, 2% and 1% surfactant. Recovery efficiency dropped from 20% to 15% when surfactant concentration dropped from 4% to 1% for the sulfate used in Example 77. For the sulfate of Example 78, recovery efficiency dropped from 18% to 17% as surfactant concentration dropped from 2% to 1%. This indicates that the cost of such a surfactant flood could be cut by reducing surfactant concentration in most cases to 1% or less without substantially lowering recovery. The sulfated products evaluated showed a wide range of salinity tolerance.

EXAMPLE 84

Sulfated Lignin Phenol

An additional sulfated lignin phenol was produced by starting with the Orzan LS-50 lignosulfonate and reducing it under 755 psi of carbon monoxide and a partial pressure of 245 psi of hydrogen sulfide at 350° C. The sulfation reagent was trimethylamine-sulfur trioxide complex. This produced a lignin phenol sulfate which was used in Examples 86 and 96.

EXAMPLES 85–87

Corefloods With Sulfated Lignin Phenols

Previous examples indicated excellent enhanced oil recovery potential for sulfated lignin phenols. Multicomponent corefloods were run with a sulfated lignin phenol substituted for surfactants and solubilizers. High salinity and low salinity systems were tested. For high salinity conditions, the lignin phenol sulfates were substituted into the solubilized petroleum sulfonate system developed by Texaco for the Salem, Ill. surfactant pilot. The Salem system was a 5% surfactant system comprised of 1.8% TRS-40/1.8% TRS-18/1.4% LN-60COS in 100% Salem injection brine (SIB). SIB has a salinity of 68,000 ppm TDS and a divalent ion content of about 4000. All surfactant blends were prepared at 2% rather than a 5% total surfactant concentration.

One foot berea sandstone cores were saturated with 100% SIB and then oil flooded with a Salem, Ill. crude having an API gravity of about 36°–38°. After water flooding with 100% SIB, a 0.2 pore volume slug of 2% active surfactant in 100% SIB was injected followed by a continuous polymer drive of 1500 ppm NalFlo 550 polyacrylamide in fresh water. NalFlo 550 is a trademarked polyacrylamide sold by Nalco Chemical Co.

Numerous different blends of the two surfactants and solubilizer were used in core floods. The best two results were achieved with a straight substitution of the lignin phenol sulfates for TRS-40 in the same concentrations as the Salem surfactant system. These results are reproduced below as Examples 85–87 in Table 13.

TABLE 13

COREFLOOD RESULTS OF LIGNIN PHENOL SULFATE/TRS-18/LN-60COS BLENDS

| | Surfactant System (% Concentration) | | | | |
|---|---|---|---|---|---|
| Example | Surfactant | TRS-18 | LN-60COS | $S_{ocf}$ | $E_R$, % |
| 85 | 0.72 (Ex. 50) | 0.72 | 0.56 | 0.09 | 77 |
| 86 | 0.72 (Ex. 84) | 0.72 | 0.56 | 0.07 | 80 |
| 87 | 0.72 (TRS-40) | 0.72 | 0.56 | 0.09 | 76[1] |

[1]Salem base petroleum sulfonate formulation.

It is interesting to note that Examples 85 and 86 with the lignin phenol sulfates of Examples 50 and 84 substituted for the TRS-40 achieved better recovery efficiencies than the Salem surfactant system itself, shown in Example 87. There were several other corefloods wherein the substitution of a lignin phenol sulfate for TRS-40 achieved a better recovery efficiency than the original Salem injection system at modified concentrations. Additionally, the solubilized lignin phenol sulfate/TRS-18/LN-60COS formulations were more tolerant to changes in the blending composition than the corresponding petroleum sulfonate systems, such as the original Salem surfactant system.

EXAMPLES 88–91

Ethoxysulfated Lignin Phenols

A lignin phenol sample with an average equivalent weight of 279 g/eq was ethoxylated at two levels, an average of six ethylene oxide groups and an average of 12 ethylene oxide groups. This corresponded to about 100 wt % ethylene oxide and about 200 wt % ethylene oxide, respectively. Each ethoxylate sample was then converted to the ethoxysulfate form by sulfation with chorosulfonic acid. Example 88 produced a lignin ethoxysulfate with an average six ethylene oxide groups. Example 89 produced a lignin phenol ethoxysulfate having an average of 12 ethylene oxide groups. Examples 90 and 91 produced ethoxylated lignin phenols having an average of 6 and 12 ethylene oxide groups.

EXAMPLES 92–95

Corefloods With Ethoxysulfated Lignin Phenols

Example 92 was a coreflood of the standard Salem base system which is offered for comparison with the lignin phenol ethoxysulfate systems of Examples 93–94. In Examples 93 and 94, the lignin phenol ethoxysulfates of Examples 88 and 89, respectively, were substituted for the water-soluble surfactant TRS-40. All corefloods were run with a 3% total surfactant concentration. The $\Delta S_o$ is the difference between the water flood residual oil saturation and the surfactant flood residual oil saturation or $Sor_w - Sor_c$, and is the measure of recovered oil volume per pore volume.

Numerous corefloods were performed with the ethoxysulfate substituted for the TRS-40. Most of the lignin phenol ethoxysulfate systems gave equal or better oil recovery than the Salem petroleum sulfonate system. In addition, these lignin phenol ethoxysulfate blends have lower solubilizer content and are, therefore, substantially more economical than the Salem base system. The corefloods reported in Examples 93 and 94 had substantially lower concentrations of the LN-60COS solubilizer, an expensive component.

TABLE 14
OPTIMUM LIGNIN PHENOL ETHOXYSULFATE 3% SYSTEMS

| Example | Surfactant System (% Concentration) | | | | $\Delta S_o$ | $E_R$ (%) |
|---|---|---|---|---|---|---|
| | TRS-18 | TRS-40 | LN-60COS | Lignin Phenol | | |
| 92 | 1.08 | 1.08 | 0.84 | — | 0.283 | 74 |
| 93 | 1.05 | — | 0.60 | 1.35 Ex. 88 | 0.304 | 79 |
| 94 | 0.90 | — | 0.30 | 1.80 Ex. 89 | 0.304 | 82 |
| 95 | 1.08 | 1.08 | — | 0.84 Ex. 88 | 0.275 | 72 |

The corefloods of Examples 93 and 94 offered the best recovery for the systems in which the lignin phenol ethoxysulfates were substituted for TRS-40. The lignin systems not only produced more oil, but they also had a steeper recovery slope, indicative of higher oil cuts.

Several additional corefloods were performed, one of which is reported as Example 95, in which a lignin phenol ethoxysulfate was substituted for the LN-60COS solubilizer, a very expensive component of the Salem base system. Recovery efficiency for Example 95 was practically the same as for the Salem surfactant system.

EXAMPLE 96

Coreflood With Ethoxysulfated Lignin Phenol

An additional coreflood was run in which the lignin phenol sulfate of Example 84 was substituted for TRS-40 in the Salem base system. The recovery efficiency of Example 96 is compared in Table 15 with the recovery efficiencies of Examples 93 and 94 which employed lignin phenol ethoxysulfate substituted for the TRS-40 in the Salem base formulation.

Table 15 implies that increasing the ethoxylation level of the lignin phenol sulfate decreases the LN-60COS solubilizer required in the surfactant blend. Reducing the amount of solubilizer offers the opportunity for substantial cost savings. In fact, there may be an ethoxylation level for the lignin product at which the LN-60COS solubilizer and the TRS-40 surfactant can be completely eliminated from the surfactant system. This would result in a two surfactant system consisting of TRS-18 and a lignin phenol ethoxysulfate. It is believed that lignin phenol ethoxysulfates having about 14 to about 18 ethylene oxide groups may offer these cheaper formulations.

TABLE 15
EFFECT OF LIGNIN SULFATE EO LEVEL ON TERTIARY RECOVERY

| Example | Lignin Sulfate EO Level | Surfactant System (% Concentration) | | | $\Delta S_o$ | $E_R$ (%) |
|---|---|---|---|---|---|---|
| | | TRS-18 | Lignin Phenol | LN-60COS | | |
| 96 | 0 | 1.08 | 1.08 Ex. 84 | 0.84 | 0.297 | 76 |
| 93 | 6 | 1.05 | 1.35 Ex. 88 | 0.60 | 0.304 | 79 |
| 94 | 12 | 1.05 | 1.80 Ex. 89 | 0.30 | 0.304 | 82 |

EXAMPLES 97–100

Sulfonation of Lignin Phenols

Lignin phenol sulfates have been shown to have utility as surfactants in chemical flooding formulations. Phenols are also easily sulfonated and sulfuric acid is one sulfonation method.

The use of sulfur trioxide, $SO_3$, as a sulfonating reagent for lignin phenols, gives good yields of low molecular weight lignin phenol sulfonates. Liquid $SO_3$ (unstabilized, from Stauffer Chemical Co.) was allowed to react with the lignin phenol in nitrobenzene solvent at room temperature under inert nitrogen. The reaction mixture was neutralized with NaOH and the product extracted into water. A 2/1 mixture of isopropanol/water was used to remove any $Na_2SO_4$ produced in the reaction. Table 16 summarizes four sulfonates prepared using this procedure.

The IFT values in Table 16 are in the range seen for the sulfates in previous Examples. This indicates that these sulfonates will perform comparably to the lignin phenol sulfates.

The data also illustrated that the $SO_3$ stoichiometry is important. An excess of $SO_3$ may over-sulfonate the lignin phenol and give a product with higher IFT values.

TABLE 16
SULFONATION OF LIGNIN PHENOLS WITH $SO_3$

| Example | Lignin Phenol Reaction Temp. (°C.) | Sulfonation Conditions | | IFT (mdynes/cm)[3] |
|---|---|---|---|---|
| | | % Conc.[1] | $SO_3$ Stoichiometry[2] | |
| 97 | 380 | 51 | 1.1 | 1010 |
| 98 | 410 | 100[4] | 1.0 | 506 |
| 99 | 380 | 30 | .75 | 460 |
| 100 | 410 | 29 | .75 | 510 |

[1]Concentration of lignin phenol in solvent (nitrobenzene), w/w %.
[2]Mol ratio of $SO_3$ to lignin phenol.
[3]One hour IFT's determined as 2% solids in synthetic field brine (34,400 TDS) against crude oil.
[4]No solvent used.

Molecular weight analysis by gel permeation chromatography showed that Examples 99–100 were composed of only low molecular weight sulfonates. Example 97 had about 10% high molecular weight sulfonates; while the majority of Example 98 was high molecular weight sulfonate.

EXAMPLES 101–104

Sulfonation of Lignin Phenols

Other procedures for sulfonation can be employed. One method is to form a 1/1 complex between liquid $SO_3$ and dioxane. This complex is a strong sulfonating agent and readily sulfonates phenols at room temperature when nitrobenzene is used as an inert solvent. After a reaction time of about 1 hour, the reaction mixture was neutralized with NaOH and the product extracted into water. A 1/1 mixture of isopropanol/water was employed to precipitate any $Na_2SO_4$ formed during the reaction.

TABLE 17
SULFONATED LIGNIN PHENOLS
Lignin Phenol Properties

| Example | Reaction Temp. (°C.)[1] | Eq. Wt (g/eq)[2] | Mol. Wt. (g/mol)[3] | IFT (mdynes/cm) |
|---|---|---|---|---|
| 101 | 350 | 310 | 370 | 2000 |
| 102 | 380 | 330 | 310 | 490 |
| 103 | 410 | 340 | 280 | 490 |
| 104 | 450 | 350 | 240 | 310 |

[1]Reaction temperature for the high temperature reduction of lignin to produce lignin phenol.
[2]The equivalent weights are based on weak acid titration data for COOH and $\phi$OH in dimethyl sulfoxide.
[3]The molecular weights are Mn values determined by vapor pressure osmometry using tetrahydrofuran as the solvent.
[4]One hour interfacial tensions (IFT) determined for 2% solutions in 34,400 TDS brine against the mid-Continent crude oil.

EXAMPLE 105

Coreflood With Sulfonated Lignin Phenol

A single surfactant cordeflood was performed with a sulfonated lignin phenol. Example 105 in Table 18 illustrates that sulfonated lignin phenols can recover up to 24% of waterflood residual oil when used alone as primary surfactants. This is a good recovery for a single surfactant system and is comparable to the single surfactant recoveries of sulfated lignin phenols as in Table 12.

TABLE 18
SINGLE SURFACTANT COREFLOOD WITH SULFONATED LIGNIN PHENOL

| | Lignin Phenol | | | |
|---|---|---|---|---|
| Example | Feedstock | Synthesis Conditions | IFT (mdynes/cm) | $E_R$, % |
| 105 | Lignosite 458 | CO/350° C. | 370 | 24 |
| 83 | Coreflood without surfactant | — | | 6 |

EXAMPLES 106–107

Corefloods With Sulfonated Lignin Phenols

The lignin phenol sulfonates were substituted into the solubilized petroleum sulfonate system developed for the Salem surfactant pilot. Corefloods of these substituted systems in the same manner as the Examples of Table 13 gave the results of Table 19. These Examples illustrate that lignin phenol sulfonates can be effectively formulated in multiple surfactant systems.

TABLE 19
COREFLOOD RESULTS OF LIGNIN PHENOL SULFONATE/TRS-18/LN-60COS BLENDS IN SIB

| | Surfactant System (% Concentration) | | | | |
|---|---|---|---|---|---|
| Example | Lignin Surfactant | TRS-18 | LN-60COS | $S_{ocf}$ | $E_R$, % |
| 106 | 0.9 (Ex. 102) | 0.7 | 0.4 | .09 | 74 |
| 107 | 0.8 (Ex. 104) | 0.7 | 0.5 | .10 | 72 |
| 87 | 0.72 (TRS-40) | 0.72 | 0.56 | .09 | 76[1] |

[1]Salem base petroleum sulfonate formulation.

EXAMPLES 108–110

Propoxylated Lignin Phenols

The addition of propylene oxide (PO) to a lignin phenol is expected to increase its hydrophobicity. Lignin phenols were propoxylated using the following procedure. The lignin phenol was dissolved in anhydrous tetrahydrofuran. 3% KOH (based on weight of lignin phenol) was added to serve as a catalyst. The desired amount of propylene oxide was then added and the mixture sealed in a high pressure reactor. The reaction proceeded at 150° C. for about 20 hours, or until the pressure stabilized, indicating complete consumption of the propylene oxide.

The reactor was cooled and opened. A stoichiometric amount of oxalic or acetic acid was added to neutralize the KOH. The sample was filtered and the solvent removed by vacuum stripping.

The propoxylated lignin phenols were then sulfated with chlorosulfonic acid, $ClSO_3H$. Table 20 lists IFT values for three of these products.

TABLE 20
LIGNIN PHENOL PROPOXYSULFONATES

| Example | Source of Lignin Phenol | PO Level | IFT (mdynes/cm)[1] |
|---|---|---|---|
| 108 | Indulin AT/CO/350° C. | 1.6 | — |
| 109 | Indulin AT/CO/410° C. | 3.5 | 780 |
| 110 | Indulin AT/CO/410° C. | 8.0 | 950 |

[1]Determined for 2% solutions in synthetic field brine against crude oil.

EXAMPLE 111

Coreflood With Propoxysulfated Lignin Phenol

The lignin phenol propoxy sulfate (Example 110) was used in a surfactant blend with TRS-18 and LN-60COS. Phase stable systems were obtained with active IFT values ranging from 8–60 mdynes/cm. A coreflood with a surfactant system of 1.08% Example 110, 1.08% TRS-18, and 0.84% LN-60COS in SIB was injected as a 0.2 pore volume slug followed by continuous injection of 1500 ppm Nalflo 550. An excellent oil recovery of $E_R = 80\%$ and $\Delta S_o = 0.302$ was obtained.

EXAMPLES 112–116

Propoxylated/Ethoxylated Lignin Phenols

Propoxylated (PO)/ethoxylated (EO) lignin phenols are new surfactants for chemical floods. The preparation of these new lignin products involves three steps: propoxylation, ethoxylation, and sulfation or sulfonation.

Two lignin phenol products were selected for reaction. The first was a mixture of lignin phenols from different lignin reduction reactions. Weak acid titration of this mixture showed 2.96 meq/g $\phi$OH and 0.47 meq/g COOH for an equivalent weight of 292 g/eq. The average molecular weight of the lignin phenol mixture was 326 g/mol ($\overline{Mn}$, determined by vapor pressure osmometry).

The second lignin phenol sample was a sample prepared by the carbon monoxide reduction of Indulin AT at 380° C. Weak acid titrations of this lignin phenol gave 2.77 meq/g $\phi$OH and 0.22 meq/g COOH for an equivalent weight of 334 g/eq. The molecular weight ($\overline{Mn}$) by vapor pressure osmometry was 312 g/mol.

The samples were dissolved in tetrahydrofuran. KOH was added to each sample to serve as a catalyst. The samples were then charged to a reactor and allowed to react first with propylene oxide and then with ethylene oxide.

The reaction mixtures were neutralized with oxalic acid, filtered, and vacuum stripped. The products were converted to the sulfates by reaction with chorosulfonic acid, ClSO$_3$H, using the previously described procedure to yield lignin phenol (PO)$_n$(EO)$_m$SO$_3$Na. They are listed in Table 21.

TABLE 21
LIGNIN PHENOL PROPOXY ETHOXYSULFATES

| Example | Lignin Phenol | PO Level (n) | EO Level (m) |
|---------|---------------|--------------|--------------|
| 112 | mixture | 3 | 2 |
| 113 | mixture | 5 | 2 |
| 114 | — | 6 | 2 |

Corefloods with the lignin phenol propoxy ethoxysulfates blended with petroleum sulfonate TRS-18 and LN-60COS showed excellent oil recoveries. Examples 115 and 116 of Table 22 had recovery efficiencies of 81% and 71%.

TABLE 22
COREFLOODS WITH LIGNIN PHENOL PROPOXY ETHOXYSULFATE BLENDS IN SIB

| Example | Surfactant System (% Concentration) | | | $\Delta S_o$ | $E_R$, % |
|---------|--------|------------------|---------|-------|-------|
| | TRS-18 | Lignin Surfactant | LN-60COS | | |
| 115 | 1.05 | 1.50 (Ex. 114) | 0.45 | .305 | 81 |
| 116 | 0.90 | 1.80 (Ex. 114) | 0.30 | .270 | 71 |

EXAMPLE 117

Alkylated Lignin Phenols

Alkylated lignin phenols are more oil soluble than lignin phenols. 5.0 grams of lignin phenol was refluxed with 5.0 grams 1-hexadecene in a nitrogen atmosphere. Four 0.1 grams portions of AlCl$_3$ catalyst were added over a period of 1.5 hours. Progress of the Friedel Crafts reaction was followed by HPLC analysis. After 18 hours the reaction was judged complete.

The alkylation reaction mixture was hydrolyzed and the product sulfated with trimethylamine-sulfur trioxide complex, Me$_3$NSO$_3$. HPLC analysis showed complete conversion of the alkylated lignin phenol to the sulfate.

The sulfated, alkylated lignin phenol product had low solubility in water and isopropanol, but was very soluble in tetrahydrofuran or chloroform. An IFT determination of a 2% solution in synthetic field brine (containing 1% LN-60COS to solubilize the sulfate) gave a value of 1200 mdynes/cm against crude oil.

EXAMPLES 118-122

Alkylation Phenol Products With A Mannich Reaction

The Mannich reaction is another method of alkylating lignin phenol. A methylene amine group is introduced on a lignin phenol by reacting the lignin phenol with formaldehyde and an amine. This increases the oil solubility of the lignin phenol and raises its equivalent weight.

The lignin phenol of Example 25 (250 g/eq based on titratable $\phi$OH and COOH) was reacted with twice the number of equivalents of formaldehyde and dihexylamine, (C$_6$H$_{13}$)$_2$NH, in refluxing dioxane. The Mannich reaction mixture was then sulfated with trimethylamine-sulfur trioxide using the standard method. The Example 118 sulfated Mannich product had an IFT value of 110 mdynes/cm versus crude oil when formulated as a 2% solution in synthetic field brine. Other Mannich lignin phenol products are shown in Table 23.

TABLE 23
SULFATED MANNICH REACTION PRODUCTS FROM LIGNIN PHENOLS

| Example | Source of Lignin Phenol | Amine | % Stoichiometry | IFT[1] (mdynes/cm) |
|---------|-------------------------|-------|-----------------|---------------------|
| 119 | Kraft Lignin[2] | Dihexylamine | 50 | 690 |
| 120 | Lignosulfonate[3] | N—ethylbenzyl-amine | 100 | 1010 |
| 121 | — | N—ethylbenzyl-amine | — | 5720 |
| 122 | Lignosulfonate[3] | — | — | 2080 |

[1]IFT aftger 1 hour as a 2% solution in synthetic field brine vs. crude oil.
[2]Indulin AT/1000 psi CO/240 psi H$_2$S/350° C./30 min.
[3]Lignosulfonate/900 psi CO/200 psi H$_2$S/350° C./30 min.

Two control reactions were performed. The first, Example 121, reacted N-ethylbenzylamine with trimethylamine-sulfur trioxide complex. This produced a product that was not surface active, as its IFT value was 5700 mdynes/cm. The second control reaction, Example 122, first reacted lignin phenol with formaldehyde and then trimethylamine-sulfur trioxide complex. Both these Examples showed the effect of leaving out a step in the Mannich reaction. Products with high IFT values result if one component or step is omitted in these products. This illustrates that the sulfated Mannich products are the surface active species in the product mixtures.

EXAMPLES 123-129

Sulfomethylation of Lignin Phenols

The sulfomethylation reaction involves the lignin phenol, a base, sodium sulfite (Na$_2$SO$_3$), and formaldehyde (CH$_2$O). It adds the sulfomethylene group (—CH$_2$SO$_3$Na) to the phenol.

10.0 grams of Example 26 lignin phenol (31.3 meq) were reacted with 2.12 grams Na$_2$CO$_3$ (20.0 meq), 10.1 grams Na$_2$SO$_3$ (80.0 meq), and 1.80 grams CH$_2$O (60.0 meq) in 100 ml of a 1:1 ratio of water:isopropanol solvent at reflux for 18 hours. Unreacted lignin phenols were removed by ether extraction. The sulfomethylated product was separated from the inorganic by-products by extraction into a 1:2 mixture of water and isopropanol.

Molecular weight analysis by gel permeation chromatography showed only low molecular weight (Mw) product of about 500 g/mole. The isolated yield of Example 123 sulfomethylated lignin phenol was 690 grams (51%). IFT values of three sulfomethylated lignin phenols are given in Table 24.

TABLE 24

IFT VALUES OF SULFOMETHYLATED LIGNIN PHENOLS

| Example | Source of Lignin Phenol[1] | | | IFT (mdynes/cm)[2] |
|---|---|---|---|---|
| | Lignin | H₂S (psi) | Temp (°C.) | |
| 123 | Ex. 26 | 245 | 350 | 400 |
| 124 | Indulin AT | 0 | 345 | 1300 |
| 125 | Indulin AT | 0 | 325 | 1040 |

[1]Each prepared in a high pressure reaction with 900–1000 psi CO.
[2]Interfacial tension measured for a 2% product solids solution in synthetic field brine (35,000 TDS) against crude oil.

The data in Table 24 shows a correlation between IFT values and the use of hydrogen sulfide in carbon monoxide reduction of lignin. An IFT value of 400 mdynes/cm corresponded to the use of hydrogen sulfide, while Examples 124 and 125 prepared without hydrogen sulfide had values greater than or equal to 1000 mdynes/cm.

The sulfomethylated lignin phenols were evaluated in corefloods as single surfactants and as blends with other surfactants or solubilizers. The recovery efficiencies are reproduced in Table 25.

TABLE 25

COREFLOOD WITH SULFOMETHYLATED LIGNIN PHENOLS

| Example | Surfactant System (% Concentration) | | | $E_R$, % |
|---|---|---|---|---|
| | Lignin Surfactant | TRS-18 | LN-60COS | |
| 126 | 2.0, Ex. 123 | — | — | 21 |
| 127 | 2.0, Ex. 124 | — | — | 17 |
| 128 | 0.6, Ex. 123 | 0.8 | 0.6 | 73 |
| 129 | 0.7, Ex. 125 | 0.7 | 0.6 | 72 |

Examples 126–129 show good recoveries when the sulfomethylated lignin phenols are used as single surfactant systems. The sulfomethylated lignin phenols can also be used in surfactant blends with TRS-18 and LN-60COS to form a surfactant system comparable to the original Salem surfactant system.

Many variations and modifications may be made in the concepts described above by those skilled in the art without departing from the concepts of the present invention. Accordingly, it should be clearly understood that the concepts disclosed in the description are illustrative only and are not intended as limitations on the scope of the invention.

What is claimed is:

1. A method of producing surfactants from lignin, which comprises:
   placing lignin in contact with water;
   converting the lignin into low molecular weight-lignin phenols by reducing the lignin in the presence of a reducing agent of carbon monoxide or hydrogen,
   said reduction occurring at a temperature greater than about 200° C. and a pressure greater than about 100 psi;
   recovering the oil soluble lignin phenols from the reaction mixture;
   converting the lignin phenols into lignin surfactants by a reaction selected from the group consisting of alkoxylation, sulfonation, sulfation, alkylation, sulfomethylation, and alkoxysulfation.

2. The method of claim 1, wherein the reducing agent is hydrogen which blankets the reduction reaction mixture at an initial pressure greater than about 500 psi.

3. The method of claim 2, further comprising the addition of sodium hydroxide to the reduction reaction mixture in a concentration of about 1% to about 15% by weight based on the lignin.

4. The method of claim 2, wherein the lignin is lignosulfonated, and further comprising adding a ferrous salt to the reaction mixture in a concentration of about 1% to about 15% by weight based on the lignosulfonate.

5. The method of claim 2, wherein the lignin is kraft lignin, alkali lignin or desulfonated lignosulfonate, and further comprising adding about 1% to about 15% by weight of Raney Nickel catalyst to the reduction reaction mixture, based on the weight of the lignin.

6. The method of claim 1, further comprising the addition of sodium hydroxide to the reduction reaction mixture in a concentration of about 1% to about 15% by weight based on the lignin.

7. The method of claim 1 wherein the reducing agent is carbon monoxide, which blankets the reduction reaction mixture at a pressure greater than 500 psi.

8. The method of claim 7, further comprising the addition of a catalyst of hydrogen sulfide to the reduction reaction mixture at a pressure greater than about 50 psi.

9. The method of claim 7, further comprising the addition of a catalyst of hydrogen sulfide or sodium sulfide to the reaction mixture in a concentration of about 1% to about 20% by weight.

10. The method of claim 1, further comprising placing the lignin in an aqueous medium for the reduction reaction.

11. The method of claim 10, wherein the lignin content of the aqueous medium is about 5% to about 20% by weight.

12. The method of claim 1, further comprising placing the lignin in a solvent of pasting oil for the reduction reaction.

13. The method of claim 1, wherein an organic solvent is used to recover the oil soluble lignin phenol from the reduction mixture.

14. The method of claim 13, wherein the organic solvent is ether, diethyl ether, tetrahydrofuran, benzene, or toluene.

15. The method of claim 1, wherein the reduction reaction occurs at a temperature of about 300° C. to about 550° C.

16. The method of claim 1, wherein the reduction reaction mixture is maintained at reaction temperature and pressure for about 10 minutes to about 20 hours.

17. The method of claim 1, wherein the reducing agent is a mixture of carbon monoxide and hydrogen which blankets the reduction reaction mixture at a pressure greater than about 500 psi.

18. The method of claim 1, wherein the reducing agent is synthesis gas which blankets the reduction reaction mixture at a pressure greater than about 500 psi.

19. The method of claim 1, further comprising sulfating the lignin phenols with a trimethylamine-sulfur trioxide complex.

20. The method of claim 19, further comprising adding about 0.5 to about 2 equivalents of sodium hydroxide, about 0.5 to about 2 equivalents of sodium carbonate, and about 0.5 to about 2 equivalents of sodium bicarbonate to the sulfation reaction mixture for each equivalent of lignin phenol.

21. The method of claim 19, wherein the sulfation reaction is conducted at about 40° to about 60° C. for about 5 to about 25 hours.

22. The method of claim 1, further comprising sulfating the lignin phenol with chlorosulfonic acid in an anhydrous reaction media.

23. The method of claim 22, wherein the anhydrous reaction media is diethyl ether, tetrahydrofuran, or a mixture of diethyl ether and tetrahydrofuran.

24. The method of claim 22 wherein the sulfation reaction is conducted at about 0° C. to about 15° C. for about 1 to 5 hours.

25. The method of claim 1, further comprising sulfomethylating the lignin phenol.

26. The method of claim 1, further comprising sulfonating the lignin phenol with sulfuric acid, sulfur trioxide, or sulfur trioxide-dioxane complex.

27. The method of claim 1, wherein the lignin surfactant is an alkoxysulfated lignin phenol having about 4 to about 20 ethylene oxide groups.

28. The method of claim 1, wherein the lignin surfactant is an alkoxysulfated lignin phenol having about 4 to about 20 propylene oxide groups.

29. The method of claim 1, wherein the lignin surfactant is an ethoxylated lignin phenol.

30. The method of claim 1, wherein the lignin surfactant is a propoxylated lignin phenol.

31. The method of claim 1, wherein the lignin surfactant is a butoxylated lignin phenol.

32. The method of claim 1, wherein the lignin surfactant is alkoxylated with different alkylene oxides.

33. The method of claim 32, wherein the lignin surfactant is first propoxylated and then ethoxylated.

34. The method of claim 33, further comprising sulfating the propoxylated/ethoxylated lignin phenol.

35. The method of claim 33, further comprising sulfonating the propoxylated/ethoxylated lignin phenol.

36. The method of claim 32, wherein the lignin surfactant is first butoxylated and then ethoxylated.

37. The method of claim 36, further comprising sulfating the butoxylated/ethoxylated lignin phenol.

38. The method of claim 36, further comprising sulfonating the butoxylated/ethoxylated lignin phenol.

39. The method of claim 1, wherein the lignin surfactant is first alkoxylated and then sulfonated.

40. The method of claim 1, wherein the lignin surfactant is first alkoxylated and then sulfated.

41. The method of claim 1, wherein the lignin surfactant is alkylated by Friedel Crafts alkylation or by a Mannich reaction.

42. The method of claim 1, further comprising subjecting the lignin surfactant products to a second reaction selected from the group consisting of alkoxylation, sulfonation, sulfation, alkylation, sulfomethylation, and alkoxysulfation.

* * * * *